(12) United States Patent
Laizerovich et al.

(10) Patent No.: US 10,095,369 B1
(45) Date of Patent: Oct. 9, 2018

(54) SYSTEMS AND METHODS FOR PROVISIONING COMPUTING COMPONENTS THROUGH MODULAR ORCHESTRATION

(71) Applicant: VCE Company, LLC, Richardson, TX (US)

(72) Inventors: Orone Laizerovich, Plano, TX (US); Michelle Proctor, Wylie, TX (US); David Tyszkiewicz, San Jose, CA (US); Thomas Otake, Irving, TX (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 344 days.

(21) Appl. No.: 14/526,045

(22) Filed: Oct. 28, 2014

(51) Int. Cl.
*G06F 3/00* (2006.01)
*G06F 3/0481* (2013.01)
*G06F 3/0484* (2013.01)

(52) U.S. Cl.
CPC ........ *G06F 3/0481* (2013.01); *G06F 3/04842* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,676,552 B2* | 3/2010 | Eilam | ................... | G06F 9/5061 379/242 |
| 2004/0088417 A1* | 5/2004 | Bober | ................. | H04L 67/1097 709/227 |
| 2005/0198629 A1* | 9/2005 | Vishwanath | .............. | G06F 8/61 717/174 |
| 2009/0249290 A1* | 10/2009 | Jenkins | ............. | G06F 17/30011 717/109 |
| 2009/0271607 A1* | 10/2009 | Karve | ................... | G06F 9/5011 713/100 |
| 2011/0055399 A1* | 3/2011 | Tung | ...................... | G06F 9/5072 709/226 |
| 2012/0093508 A1* | 4/2012 | Baykal | ................ | H04L 12/2881 398/58 |
| 2012/0151353 A1* | 6/2012 | Joanny | ................ | H04L 29/0899 715/735 |
| 2012/0151358 A1* | 6/2012 | Joanny | .................. | G06F 9/5011 715/736 |

* cited by examiner

*Primary Examiner* — Hien L Duong
(74) *Attorney, Agent, or Firm* — Polsinelli PC

(57) ABSTRACT

Methods and/or systems for automatically provisioning various computing components within a computing environment, such as a computing infrastructure are disclosed. More particularly, various compute, network, and storage components of a converged infrastructure, such as servers, databases, applications, operating systems, memories, switches and/or the like, may be automatically provisioned and allocated for use and access.

20 Claims, 5 Drawing Sheets

SYSTEMS AND METHODS FOR PROVISIONING COMPUTING COMPONENTS THROUGH MODULAR ORCHESTRATION

TECHNICAL FIELD

Aspects of the present disclosure relate to provisioning computing components.

BACKGROUND

Large scale information technology ("IT") organizations—e.g., those typically found in enterprise-class organizations and service providers—have embraced computing infrastructures as a mechanism for providing computing components, in the form of resources, to requesting applications and/or services in an efficient and manageable manner. For example, many IT organizations employ computing infrastructures to provide various computing components, such as servers, switches, databases, and/or the like, to multiple front-end user applications simultaneously. The building and provisioning of a computing infrastructure and its corresponding computing components that are capable of supporting such applications and/or services typically requires manual intervention that is both labor-intensive and time-consuming.

SUMMARY

Aspects of the present disclosure involve systems, methods, and/or non-transitory computer-readable mediums for provisioning a computing component. The methods, and/or non-transitory computer-readable mediums include generating at least one graphical user interface for display on a computing device. The at least one graphical user interface includes at least one selectable module graphically representing at least one computing component identifying a set of rules defining how to provision the at least one computing component for deployment in a plurality of interconnected computing components. The methods, and/or non-transitory computer-readable mediums further include provisioning the at least one computing component by providing provisioning data as a parameter to the at least one rule of the set of rules, the provisioning data corresponding to a user; and executing the set of rules, including the at least one rule to provision the at least one computing component.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
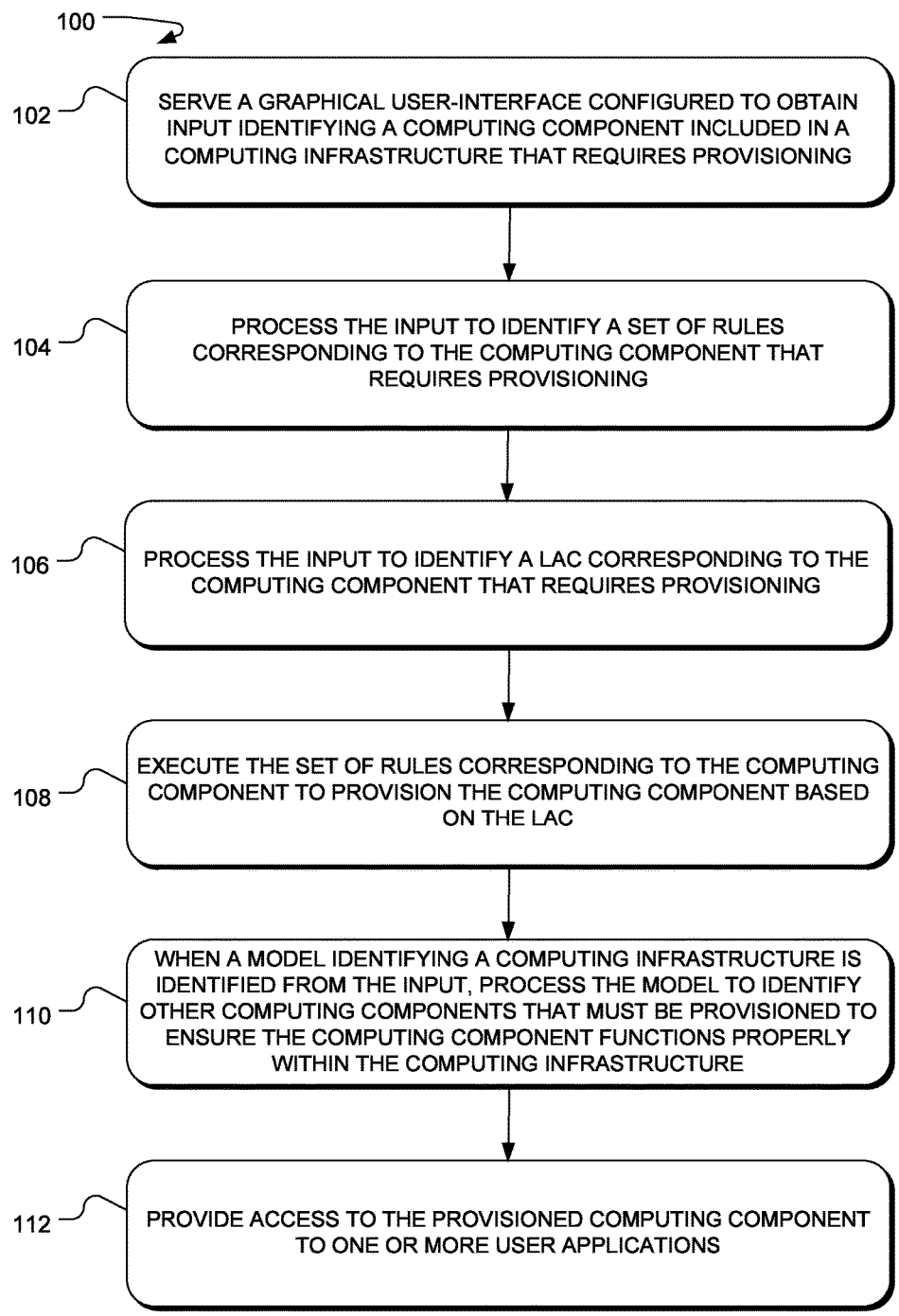
FIG. 1 is a flowchart illustrating an example process for automatically provisioning interconnected computing components included within a computing environment, according to aspects of the present disclosure.

Aspects of the present disclosure involve systems and/or methods for the automatic allocation and/or provisioning of various systems and/or interconnected computing components included within a computing environment. More particularly, various compute, network, and/or storage components, such as servers, databases, operating systems, memories, switches and/or the like, may be automatically provisioned and allocated for use and access. In various aspects, information and/or data corresponding to the one or more computing components and related to the provisioning of those components may be obtained by the system, such as via graphical-user interface. Based on the obtained information, the system may automatically identify a set of logical rules, which when executed, automatically provision the various computing components.

"Provisioning" describes a process for automatically configuring various computing components of a computing infrastructure to enable the computing component to perform and/or function in a particular manner and enable the provisioned computing component to be provided to requesting applications as a resource. For example, provisioning a computing component may include: installing, uninstalling, configuring, upgrading, and/or updating various software and/or hardware of, and/or associated with, the specific computing component being provisioned. Aspects of the present disclosure involve mechanisms for automatically provisioning computing components included in a larger computing infrastructure environment.

In one specific implementation, the systems described herein may be used to provision components of a converged infrastructure ("CI"). Generally speaking, converged infrastructures typically refer to computing systems implemented in a virtual computing environment that includes a structured combination of multiple virtual objects that are executed on independently functioning hardware resources commonly referred to as hosts. Distributed computing systems 110 implemented in a virtual computing environment may be advantageous in that they are dynamically configurable to continually adapt to ever changing requirements typically exhibited by modern distributed computing systems. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications.

In another aspect, the distributed computing system 110 comprises a combination of converged infrastructures configured in a cloud computing environment. While some examples disclosed herein reference converged infrastructures, also sometimes referred to as unified computing systems, fabric-based computing systems, and dynamic infrastructures, systems and methods described herein may be applied to other computing environments.

Figure 2A:
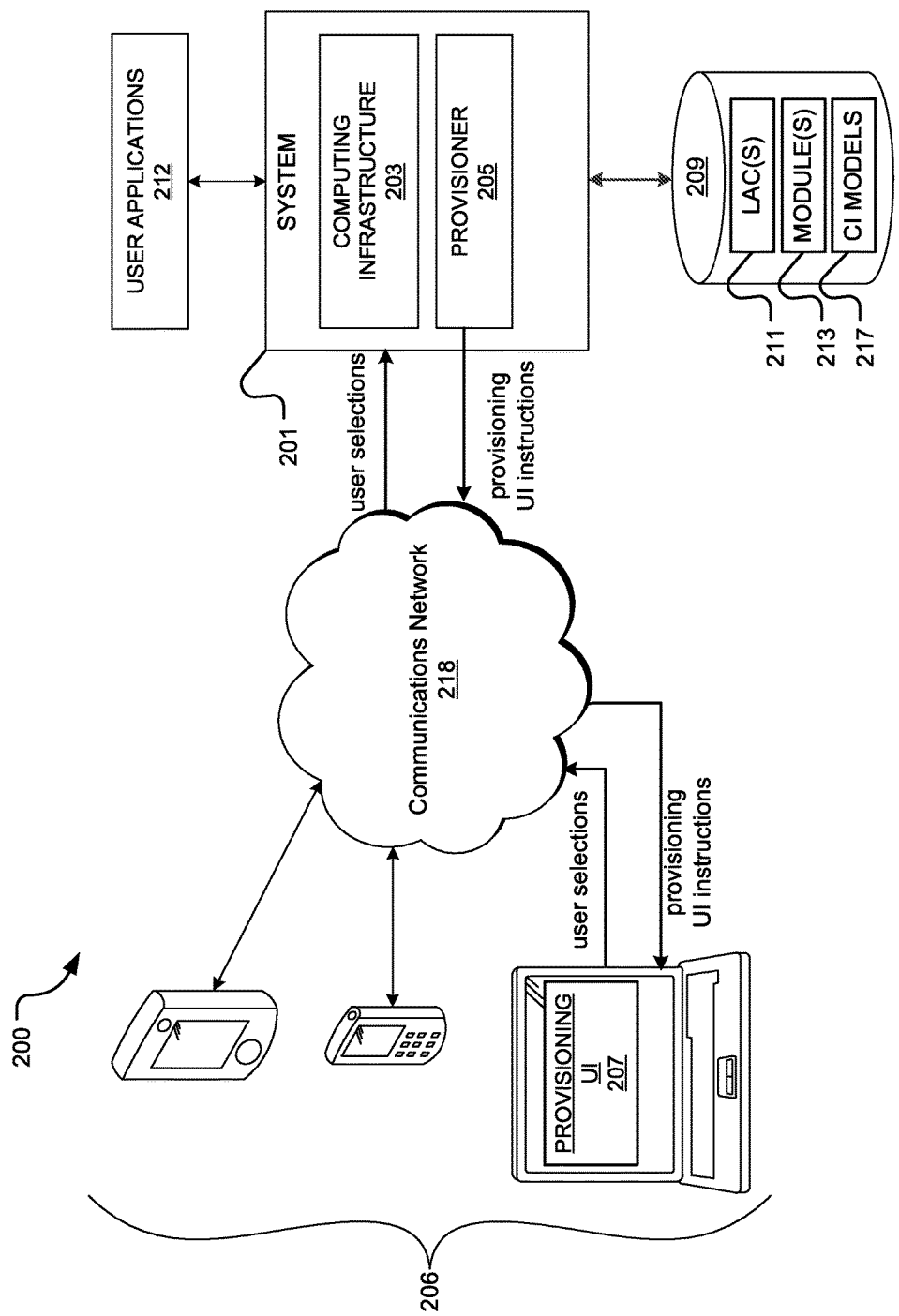
FIGS. 2A-2B are block diagrams illustrating a computing environment for automatically provisioning computing components included within a computing environment, according to aspects of the present disclosure.
Figure 2B:
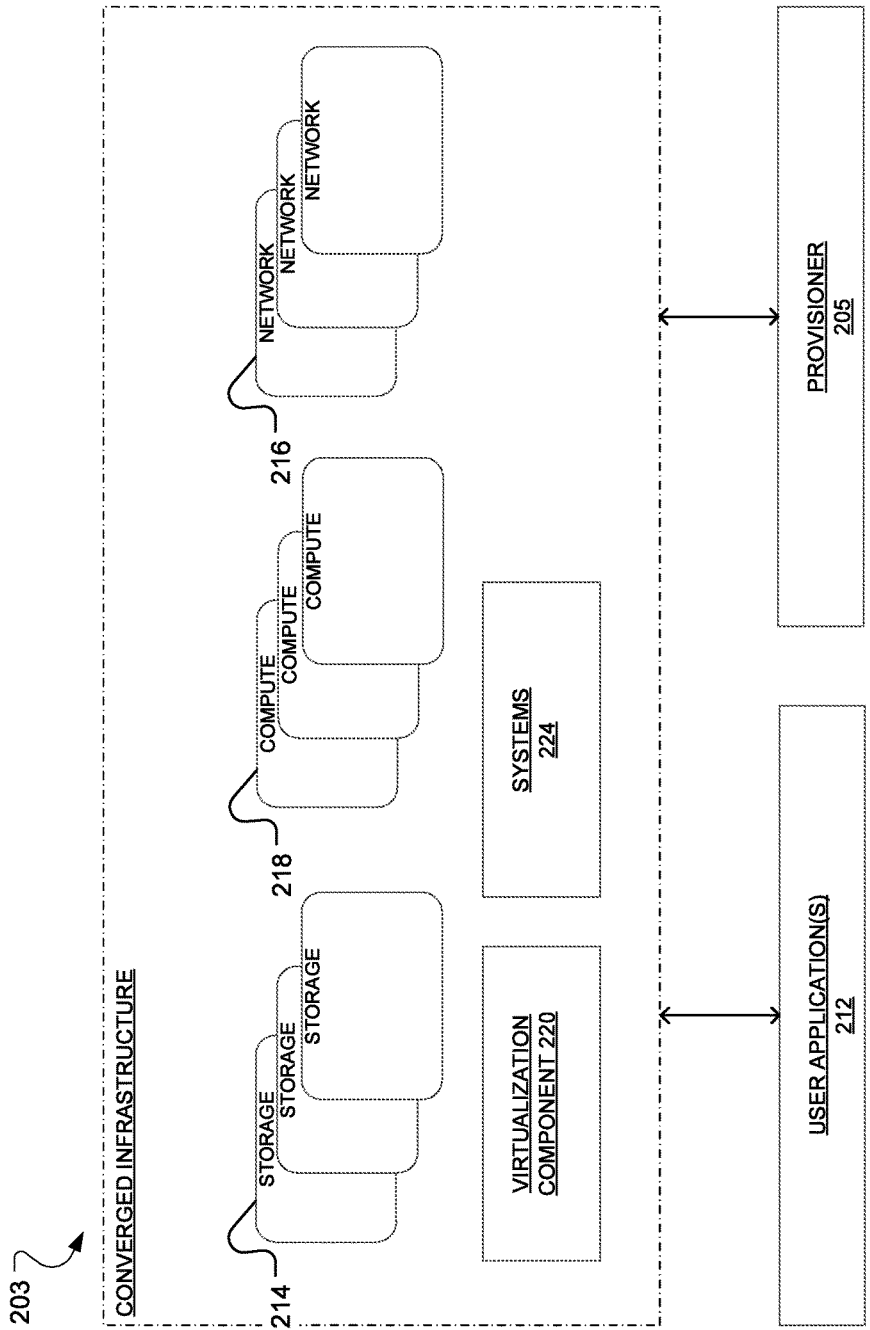

An illustrative process and system for provisioning various computing components included within a computing environment are depicted in FIGS. 1 and 2, respectively. FIG. 1 illustrates an example process 100 for automatically provisioning computing components included within a computing environment. FIGS. 2A and 2B illustrate a computing architecture 200 including hardware and/or software components that may be used to perform or otherwise execute the process 100 of FIG. 1. More specifically, FIG. 2A illustrates and example computing architecture 200 involving various computing devices that may be used to provision various computing components of a computing infrastructure or environment. FIG. 2B illustrates an example embodiment of a computing environment 220, which represents one possible specific type of computing infrastructure 203 provisionable by the system 200.

Referring generally to FIGS. 2A-2B and initially to FIG. 2A, the computing architecture 200 includes a system 201 containing a provisioner 205 that is configured to provision various compute, network, and/or storage computing components that may be logically arranged as a computing infrastructure 203 and any of which may be provided as a resource to one or more user applications 212. The user applications 212 may be accessible by users at one or more client devices 206 over a communication network 218, which may be the Internet, an intranet, an Ethernet network, a wireline network, a wireless network, and/or another communication network.

To provision a computing component, the system 201 may generate a provisioning UI (e.g., a GUI) for display at one or more client device(s) 206, which may be a personal computer, work station, server, mobile device, mobile phone, tablet device, of any suitable type. In one particular embodiment, the provisioning UI 207 may be driven by one or more modules 213 stored in a storage 209, each of which correspond to a specific provisionable computing component. Each module defines the code—the processes, instructions, rules, and/or syntax—that may be executed to provision the computing component to which the module corresponds. Thus a separate module may be pre-stored in the storage 209 for each provisionable compute, network, and/or storage computing component included within the computing infrastructure 203.

A user may interact with the provisioning UI 207, at the one or more client devices, to identify and select specific computing components for provisioning by the provisioner 205. Based on the specific user interacting with the provisioning UI 207 and the specific computing components selected by the user for provisioning (e.g., via module), the provisioner 205 of the system 201 obtains data and information from a storage 209 that may be used to automatically provision the selected components. For example and as will be described in more detail below, the storage 209 may include one or more pre-stored logical customer surveys ("LAC") 211, each of which corresponds to a specific user and includes information that may be used in the provisioning process performed by the provisioner 205 to provision computing components in a custom manner for the user.

In other embodiments, a storage 209 includes one or more model(s) 217, each of which identify a particular type of computing infrastructure, in which the user intends the selected computing components to be provisioned. The models may be processed by the system 201 to determine the correct type of firmware and/or hardware components that must be provisioned, along with the user-selected computing components, to enable the selected computing component to function properly within a larger computing infrastructure configuration. Although the storage 209 is depicted as being a part of the system 201, it is contemplated that the storage may be located externally or elsewhere, in operable communication with the system 201.

FIG. 2B is an illustration of the computing infrastructure 203 that may be provisioned by the provisioner 205 and subsequently managed by the system 201, according to one embodiment. As illustrated, the computing infrastructure 203 includes a set of modular and configurable computing components, including one or more storage components 214 to provide data storage and/or data management capabilities; one or more network components 216 to provide network connectivity; one or more compute components 218 to provide processing capacity; a virtualization component 220, such as a hypervisor, to host virtual environments (e.g., virtual operating systems and applications); and various other systems 224 included within the computing infrastructure 203. The components are provided to, or otherwise accessed by, the user applications 212 that require varying levels of storage, network, compute, and/or virtualization resources. The provisoner 205 of the system 201 provides the centralized and automated logic that provisions, manages and/or otherwise orchestrates the various computing components (e.g. 214, 216, 218, and 220) of the computing infrastructure 203. In one particular embodiment, the computing infrastructure 203 may be a Vblock™ Systems computing infrastructure.

Figure 3:
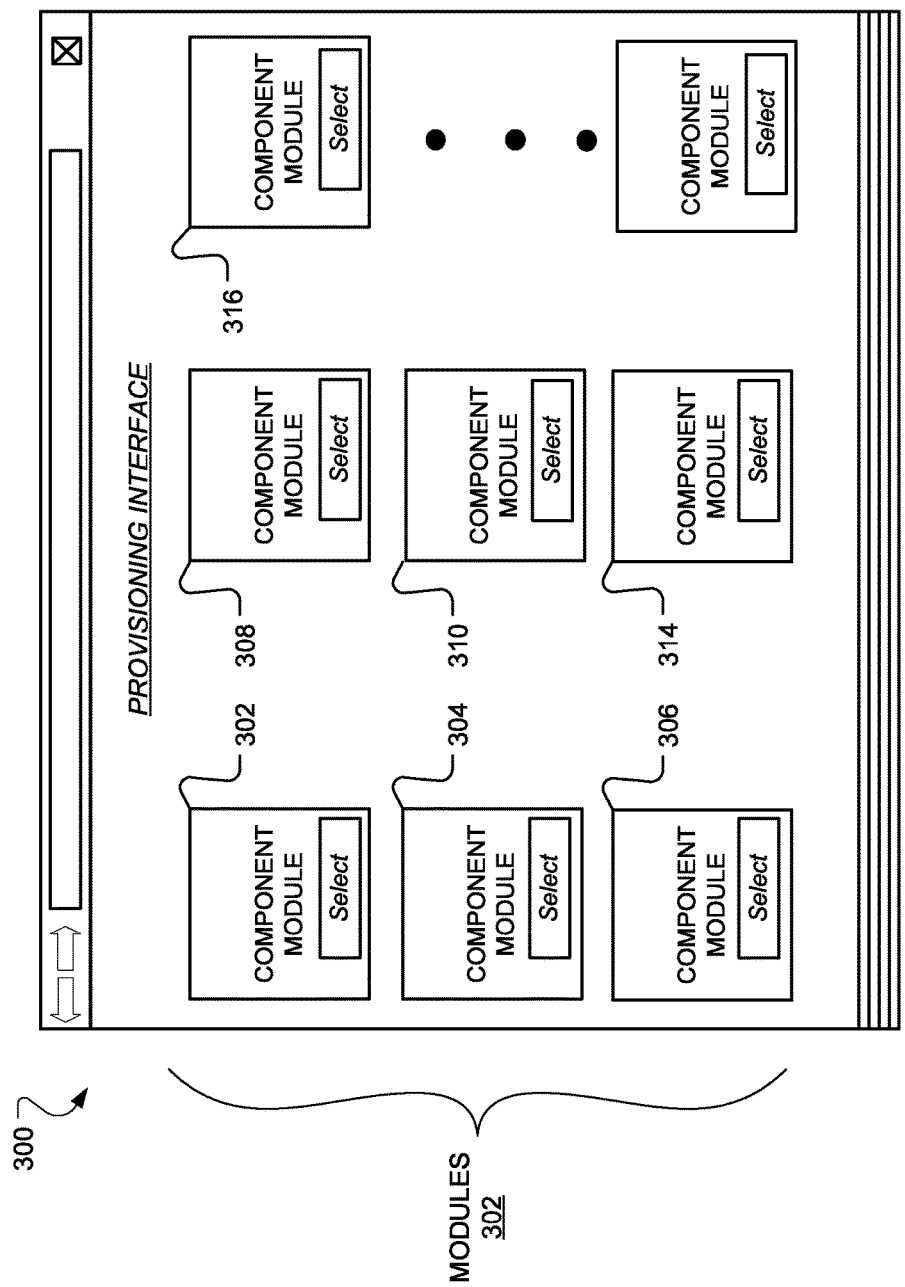
FIG. 3 is an illustration of a graphical user-interface, according to aspects of the present disclosure.

Referring now to FIG. 1, process 100 begins with generating and serving one or more interactive interfaces/input forms (e.g. a user-interface or graphical user-interface (GUI)) for identifying a computing component(s) of a computing infrastructure that requires provisioning (operation 102). In particular, the system 201 may generate and/or otherwise provide one or more GUIs including various interactive elements, such as buttons, forms, fields, selections, inputs, streams, images, etc., through which a user may identify one or more computing components of the computing infrastructure that require provisioning. FIG. 3 provides an example illustration of a graphical user-interface 300 that may be used to identify one or more computing components of the computing infrastructure 203 that may require provisioning. In the illustrated embodiment, one or more modules are provided, (collectively referred to as "modules 302"), each of which represents a different computing component of the computing infrastructure 203 that may be identified as a potential candidate for provisioning. In one embodiment, to populate the generated graphical user-interface 300, the system 201 queries the storage 209 to obtain and/or otherwise identify one or more modules of the modules 213 that correspond to the computing components of the computing infrastructure 203.

Each module of the modules 302 displayed within the graphical user-interface 300 may be individually selected, for example by a user, indicating to the system 201 that the computing component corresponding to the module should be provisioned or otherwise configured. In the illustrated embodiment, modules 304-310 identify one or more servers (a compute component) of the computing infrastructure 203 that may require provisioning and/or be provisioned. For example, a user interested in provisioning a server may provide input to the GUI 300 selecting or otherwise identifying module 304. Module 314 identifies one or more switches and module 316 identifies one or more routers (network components) that may be provisioned. Thus, a user interested in provisioning a switch, may provide input to the GUI 300 selecting or otherwise identifying module 314, indicating that a switching component should be provisioned. Module 318 identifies a storage device that may require provisioning. Users interested in provisioning a storage device, such as a database, may provide input to the GUI 300 selecting or otherwise identifying the module 318, indicating that a storage device should be provisioned. It is contemplated that any computing component of a computing environment, such one or more of the computing components included in the computing infrastructure 203, may be included as a module within the interface 300, and further, that different versions of the same component type may be included within the interface 300 as a selectable module. It is further contemplated that multiple modules 302, corresponding to different computing components, or the same computing component may be selected and/or otherwise identified by a user at any one time. For example, in one embodiment, a user may select multiple modules 302 of the GUI 300 to identify an entire computing infrastructure solution for automatic provisioning by the provisioner 205.

In one particular embodiment, the user may provide input indicating that the selected components may be provisioned as a part of a configuration of an overall orchestration of a large computing infrastructure. In particular, the user may identify or otherwise select a specific type of computing infrastructure model that identifies relationships between the specific computing components that the user selected for provisioning and the other components included within the computing infrastructure that may be provisioned during the overall orchestration of the larger computing infrastructure.

Referring again to FIG. 1, the selected computing component(s), via the identified modules, may be used to obtain or otherwise identify a set of custom rules and/or syntax that define the instructions, commands, application programming interface calls, and/or the like, that will be executed by the provisioner 205 to provision the identified computing component(s) (operation 104). Referring to the GUI 300 of FIG. 3, each module may correspond to or otherwise include a set of custom rules and/or syntax that that leverages the obtained provisioning data (e.g., an LAC) in the form of parameters.

Referring back to operation 104 of FIG. 1, in addition to identifying a custom set of rules and/or syntax for the selected computing components, the input provided by the user and corresponding to the selected computing component(s) may be used to obtain LAC information that describes various user customizations for provisioning the selected computing component(s) (operation 106). In one embodiment, the provisioner 205 of the system 201 may use the input provided by the user to the provisioning UI 207 to identify a LAC from the storage 209 that may include specific naming conventions for generating component names when provisioning the selected computing components. Additionally, the LAC may include serial numbers and/or Internet Protocol addresses for use in provisioning network aspects of the selected computing components. The LAC may include serial numbers that may be used during the provisioning to uniquely identify the selected computing components. For example and with reference to FIG. 3, if a user provided input to the GUI 300 selecting the module 310, indicating that a server (i.e., a compute component) should provisioned, the system 201 may query the storage 209 and identify a LAC corresponding to the user. Subsequently, the system 201 may parse the identified LAC to obtain information that may be useful in provisioning portions of the selected server computing component, such as for example information related to IP address ranges, which may be used to generate IP addresses and/or define host names for the server component. Alternatively, if a LAC with the required IP address information cannot be identified from the storage 209, the system 201 may request the user to provide the required information (e.g., via the provisioning UI 207) to the system 201.

After identifying any custom rules and/or syntax and accessing any LAC information, one or more of the rules included within the custom rules and/or syntax may be executed to provision the one or more computing components within the computing infrastructure (operation 108). The provisioner 205 of the system 201 may execute the various processes, procedures and/or instructions defined within the identified custom rules and/or syntax, which when executed automatically provision the selected computing component(s). For example, if the module 310 of FIG. 3 were identified for provisioning, indicating that a server (i.e., a compute component) should provisioned, the provisioner 205 of the system 201 will execute the set of custom rules and/or syntax defined by the module 310, based on the LAC corresponding to the user, to provision the selected computing components. In one embodiment, the custom rules and/or syntax may contain at least one rule that includes parameters from the LAC information.

When a computing infrastructure model is identified from the user input, the system 201 may use the model to identify other components of the computing infrastructure that must be configured, along with the selected component(s), to enable the user-selected computing components to function properly within the larger computing infrastructure environment (operation 110). In one embodiment, the system 201 may trigger the provisioner 205 to perform various validation procedures to ensure enough hardware has been allocated and/or otherwise provisioned and configured to support the newly provisioned computing component selected by the user. In another embodiment, the system 201 may trigger the provisioner 205 to perform various verification procedures to ensure that the correct firmware is installed to support the both the newly provisioned computing component selected by the user, and any additional hardware that was provisioned to support the newly provisioned computing component. All of such procedures are performed by the system 201 and/or the provisioner 205 to ensure that the newly orchestrated computing infrastructure is functioning properly.

Once the selected computing component(s) have been provisioned, the computing component(s) are activated and provided for access to one or more user applications (operation 110). The provisioned resource is fully functional, live and running, and capable of supporting and/or executing processes of requesting computing application(s), processes, and/or services for which the computing component was originally provisioned. For example, the newly provisioned computing component may be accessible by the user application(s) 212. In one embodiment, the underlying configuration of the provisioned computing component may not be accessible by a user. For example, if the provisioned computing component were an operating system, the operating system would be live and ready for user access but the underlying configurations of the provisioned operating system would not be accessible by the user, ensuring the integrity of such underlying configurations.

Figure 4:
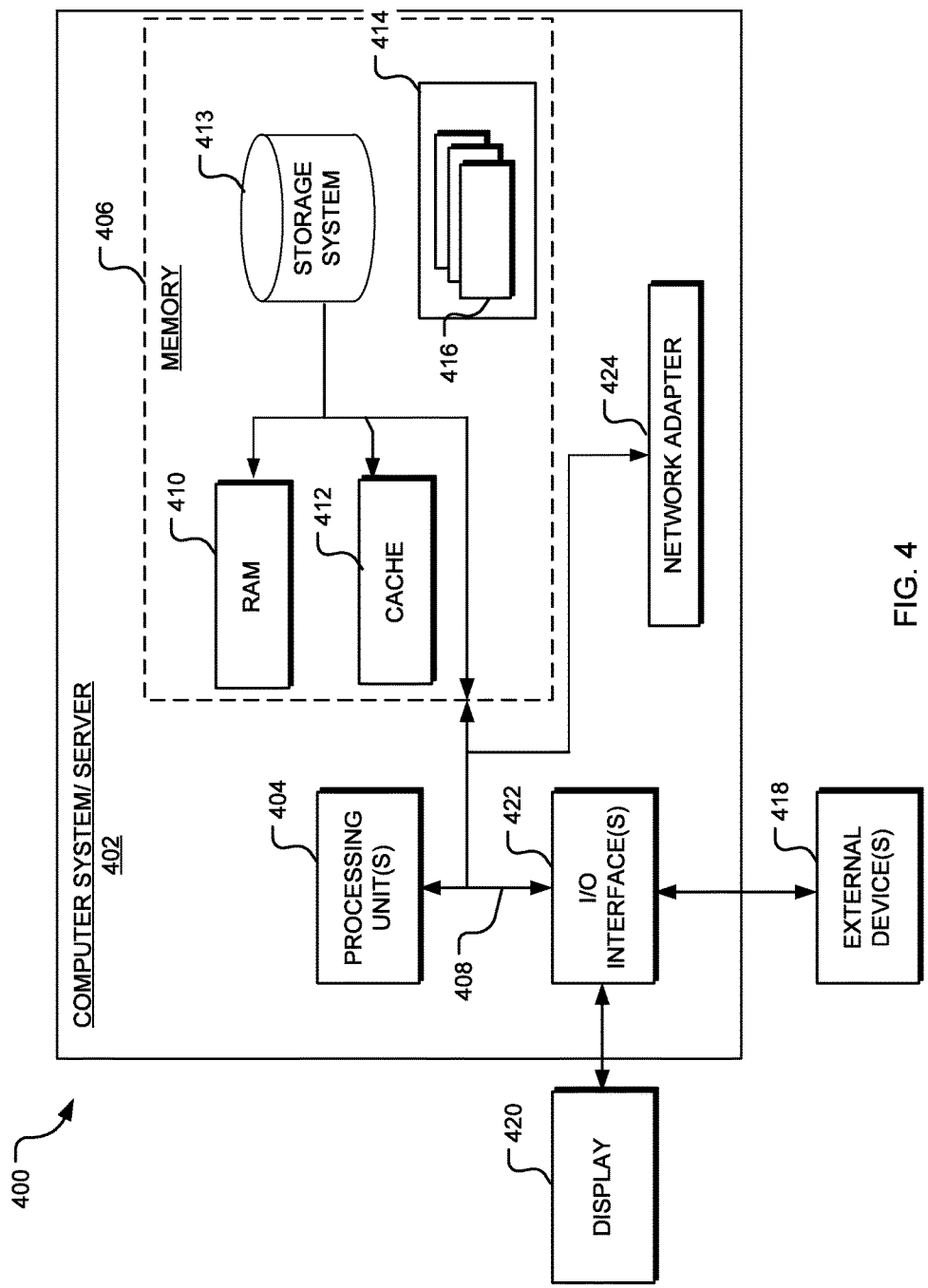
FIG. 4 is an illustration of a computing device, according to aspects of the present disclosure.

FIG. 4 illustrates an example of a computing node 400 which may comprise an implementation of the system 201. The computing node 400 represents one example of a suitable computing device and is not intended to suggest any limitation as to the scope of use or functionality of embodiments of the invention described herein. Regardless, the computing node 400 is capable of being implemented and/or performing any of the functionality described above.

As illustrated, the computer node 400 includes a computer system/server 402, which is operational with numerous other general purpose or special purpose computing system environments or configurations. Examples of well-known computing systems, environments, and/or configurations that may be suitable for use with computer system/server 402 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in computing node 400 is shown in the form of a general-purpose computing device. The components of computer system/server 402 may include one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 may include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for provisioning a computing component comprising:
   generating at least one graphical user interface for display on a computing device including a processor and non-transitory computer readable medium, the at least one graphical user interface including a plurality of selectable modules each graphically representing at least one computing component, each selectable module identifying a set of executable rules defining how to provision the at least one computing component for initial use in a plurality of interconnected computing components; and provisioning, by the at least one computing device, the at least one computing component for the initial use by:

receiving an input from the user specifying at least one desired selectable module of the plurality of selectable modules, the input further identifying a corresponding at least one desired computing component for provisioning;

inserting provisioning data specifying a unique attribute for the at least one desired computing component into a parameter of the at least one executable rule of the set of executable rules identified by the at least one desired selectable module, the provisioning data corresponding to a user;

receiving an input from the user specifying a desired computing infrastructure model from a plurality of selectable computing infrastructure modules, the desired computing infrastructure model identifying relationships between the plurality of interconnected computing components; and executing the set of executable rules identified by the desired selectable module, including the at least one executable rule, provision the at least one computing component, the executing based at least in part on the relationships identified by the desired computing infrastructure model.

2. The method of claim 1 further comprising providing the provisioned computing component to one or more user applications.

3. The method of claim 1, wherein the provisioning data includes a logical customer survey including customizations to be used when provisioning the at least one computing component, the customizations including at least one of naming conventions, Internet Protocol address ranges, and user names and passwords, the method further comprising:

analyzing the logical customer survey to identify the customizations; and providing the customizations as the parameter to the at least one executable rule of the set of executable rules.

4. The method of claim 1, further comprising:

orchestrating a complete computing infrastructure by:

provisioning each computing component of the plurality of interconnected computing components based on the desired computing infrastructure model; and wherein the at least one desired computing component is provisioned to function as a part of the computing infrastructure based on the specified by the desired computing infrastructure model.

5. The method of claim 4, further comprising verifying that acceptable firmware is installed within the plurality of interconnected computing components to enable the at least one computing component to function properly as a part of the computing infrastructure.

6. The method of claim 4, further comprising validating that sufficient hardware components of the plurality of interconnected computing components have been provisioned to enable the at least one computing component to function properly as a part of the computing infrastructure.

7. The method of claim 1, further comprising:

storing in a database, an indication that the at least one computing component has been provisioned; and providing access to at least one computing component to a requesting application.

8. A system for provisioning a computing component comprising:

at least one computing device comprising:

at least one processor; and a computer readable storage device storing instructions which, when executed by the at least one processor, cause the at least one processor to:

generate at least one graphical user interface for display, the at least one graphical user-interface including a plurality of selectable modules graphically representing at least one computing component each selectable module identifying a set of executable rules defining how to provision the at least one computing component for initial use in a plurality of interconnected computing components; and provision the at least one computing component for the initial use by:

receiving an input from the user specifying at least one desired selectable module of the plurality of selectable modules, the input further identifying a corresponding at least one desired computing component for provisioning;

inserting provisioning data specifying a unique attribute for the at least one desired computing component into a parameter of the at least one executable rule of the set of executable rules identified by the at least one desired selectable module, the provisioning data corresponding to a user;

receiving an input from the user specifying a desired computing infrastructure model from a plurality of selectable computing infrastructure modules, the desired computing infrastructure model identifying relationships between the plurality of interconnected computing components; and executing the set of executable rules identified by the desired selectable module, including the at least one executable rule, to provision the at least one computing component, the executing based at least in part on the relationships identified by the desired computing infrastructure model.

9. The system of claim 8, wherein the at least one computing device is further configured to provide the provisioned computing component to one or more user applications.

10. The system of claim 8, wherein the provisioning data includes a logical customer survey including customizations to be used when provisioning the at least one computing component, the customizations including at least one of naming conventions, Internet Protocol address ranges, and user names and passwords, and wherein the at least one computing device is further configured to:

analyze the logical customer survey to identify the customizations; and provide the customizations as the parameter to the at least one executable rule of the set of executable rules.

11. The system of claim 8, wherein the at least one computing device is further configured to:

orchestrate a complete computing infrastructure by:

provisioning each computing component of the plurality of interconnected computing components based on the desired computing infrastructure model; and wherein the at least one desired computing component is provisioned to function as a part of the computing infrastructure based on the specified by the desired computing infrastructure model.

12. The system of claim 11, wherein the at least one computing device is further configured to verify that acceptable firmware is installed within the plurality of interconnected computing components to enable the at least one computing component to function properly as a part of the computing infrastructure.

13. The system of claim 11, wherein the at least one computing device is further configured to validate that sufficient hardware components of the plurality of interconnected computing components have been provisioned to enable the at least one computing component to function properly as a part of the computing infrastructure.

14. The system of claim 8, wherein the at least one computing device is further configured to:
    store in a database, an indication that the at least one computing component has been provisioned; and
    provide access to at least one computing component to a requesting application.

15. A non-transitory computer readable medium encoded with instructions for provisioning a computing component, the instructions executable by a processor, comprising:
    generating at least one graphical user interface for display on a computing device, the at least one graphical user-interface including a plurality of selectable modules each graphically representing at least one computing component, each selectable module identifying a set of executable rules defining how to provision the at least one computing component for initial use in a plurality of interconnected computing components; and
    provisioning the at least one computing component for the initial use by:
        receiving an input from the user specifying at least one desired selectable module of the plurality of selectable modules, the input further identifying a corresponding at least one desired computing component for provisioning;
        inserting provisioning data specifying a unique attribute for the at least one desired computing component into a parameter of the at least one executable rule of the set of executable rules identified by the at least one desired selectable module, the provisioning data corresponding to a user;
        receiving an input from the user specifying a desired computing infrastructure model from a plurality of selectable computing infrastructure modules, the desired computing infrastructure model identifying relationships between the plurality of interconnected computing components; and
        executing the set of executable rules identified by the desired selectable module, including the at least one executable rule, to provision the at least one computing component, the executing based at least in part on the relationships identified by the desired computing infrastructure model.

16. The non-transitory computer readable medium of claim 15 further comprising providing the provisioned at least one computing component to one or more user applications.

17. The non-transitory computer readable medium of claim 15, wherein the provisioning data includes a logical customer survey including customizations to be used when provisioning the at least one computing component, the customizations including at least one of naming conventions, Internet Protocol address ranges, and user names and passwords, the method further comprising:
    analyzing the logical customer survey to identify the customizations; and
    providing the customizations as the parameter to the at least one executable rule of the set of executable rules.

18. The non-transitory computer readable medium of claim 15, further comprising:
    orchestrating a complete computing infrastructure by:
        provisioning each computing component of the plurality of interconnected computing components based on the desired computing infrastructure model; and
        wherein the at least one desired computing component is provisioned to function as a part of the computing infrastructure based on the specified by the desired computing infrastructure model.

19. The non-transitory computer readable medium of claim 15, further comprising verifying that acceptable firmware is installed within the plurality of interconnected computing components to enable the at least one computing component to function properly as a part of the computing infrastructure.

20. The non-transitory computer readable medium of claim 15, further comprising validating that sufficient hardware components of the plurality of interconnected computing components have been provisioned to enable the at least one computing component to function properly as a part of the computing infrastructure.

* * * * *